(No Model.)
F. A. SMITH.
ELECTRIC UNDERGROUND CABLE.
No. 280,869. Patented July 10, 1883.
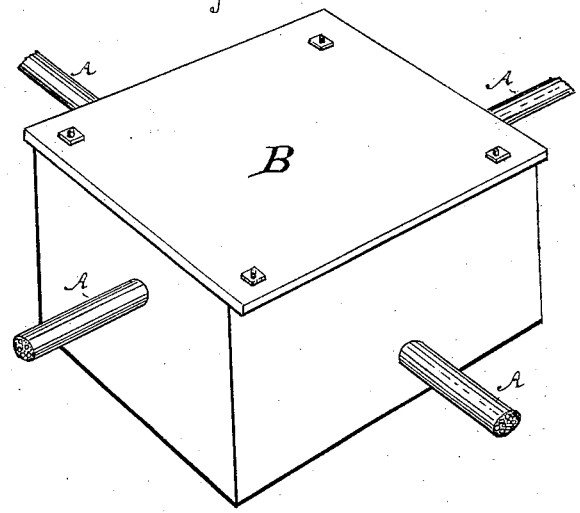
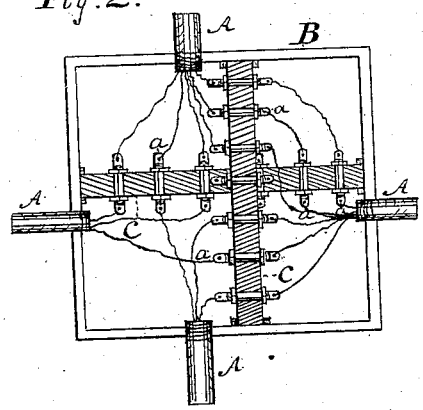
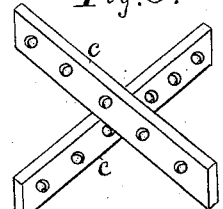
WITNESS.
INVENTOR.
F. A. Smith

UNITED STATES PATENT OFFICE.

FRANK A. SMITH, OF MACOMB, ILLINOIS.

ELECTRIC UNDERGROUND CABLE.

SPECIFICATION forming part of Letters Patent No. 280,869, dated July 10, 1883.

Application filed April 27, 1883. (No model.)

*To all whom it may concern:*

Be it known that I, FRANK A. SMITH, a resident of Macomb, in the county of McDonough and State of Illinois, have invented new and useful Improvements in Electric Underground Cables and their Connections, of which the following is a full, clear, and exact description, reference being had to the accompanying drawings, making a part of this specification, in which—

Figure 1 represents my invention in perspective. Fig. 2 is a plan. Figs. 3 and 4 are detached parts.

The novelty of this invention consists, first, in constructing and binding together a suitable number of well-insulated wires of copper or other suitable metal, so as to form an electric underground cable covered or coated with pitch or other suitable substance that is impervious to water or dampness, in combination with an air-tight box, of metal or other suitable substance, having a movable lid, so that the box can be opened and the wires connected from the different lines entering it without disturbing any other parts of the cable, and containing glass insulators and their connections; second, in improved means for connecting the wires of an underground electric cable in an air-tight box, consisting of glass insulators and their connecting-bolts.

In the drawings, B represents a strong metal box, which has a movable lid, which is secured firmly to the box by means of bolts, and is provided with suitable packing to make the joints air-tight.

A A A A represent four cables entering the box. These cables are made of well-insulated wires of copper or other suitable metal. The required number of wires are bound together by wrapping or otherwise and coated with pitch or any suitable material that will make them impervious to water. These cables enter the box, as shown in Fig. 2, the ends passing a small distance inside the box and are sealed, so as to make the entrance air-tight. Inside of the box the wires of the cable separate, so they can be connected and transferred in any direction that may be required. (Shown in Fig. 2.)

C C represent the insulators, which are made of glass, and have a series of holes through them, in which the bolts *a a a a* are secured. These insulators are arranged in the box B, as shown in Fig. 3, and as many of them as may be required. The bolts *a a a a* are made of copper or other suitable metal, and have nuts at each end, for the purpose of securing them to the insulators. The wires are attached to the bolts *a a a*, as shown in Fig. 2, and transferred to any of the cables that enter the box.

The cables are made in suitable length for use in streets or otherwise, and are placed a suitable depth in the ground. The connecting-box B is placed in the ground, with the lid even with the surface of the ground. If in cities, the cover should be level with the curbstone and at or near the street-corners, so that the cables can enter the box from different points. Auxiliary boxes can be placed in cellars or other suitable places, so that telegraph or telephone wires can be connected to the cables and messages transmitted through the cable to any point where the cable is placed.

Having thus fully described my invention, what I claim as new, and desire to secure by Letters Patent, is—

1. The cable A, composed of a suitable number of insulated wires of copper or other metal, and bound together and coated with pitch or other material that will make it impervious to water or dampness, in combination with the air-tight box B and glass insulators C C, having metal bolts *a a a* attached, substantially as shown and described.

2. The air-tight box B and cables A A A A, in combination with the glass insulators C C, having metal bolts *a a a a*, and arranged in the box as shown, so that the wires of the different cables entering the box can be connected together or disconnected, as may be required, substantially as and for the purpose set forth.

FRANK A. SMITH.

Witnesses:
L. J. PRICE.
O. F. PIPER.